United States Patent Office 3,498,760
Patented Mar. 3, 1970

3,498,760
PROCESS FOR THE PURIFICATION OF NITROSYL HYDROGEN PYROSULFATE($NOHS_2O_7$)
Giuseppe Ribaldone, Gallarate, and Giampiero Borsotti, Bollate, Italy, assignors to Montecatini Edison S.p.A., Milan, Italy, a corporation of Italy
No Drawing. Filed Feb. 14, 1967, Ser. No. 615,917
Claims priority, application Italy, Feb. 28, 1966, 4,438/66
Int. Cl. C01b 21/54; C01c 1/20
U.S. Cl. 23—357                          6 Claims

ABSTRACT OF THE DISCLOSURE

A method of purifying nitrosyl hydrogen pyrosulfate-$NOHS_2O_7$ (a compound which can be produced by directly reacting nitrosyl hydrogen sulfate, $NOHSO_4$, with a sulfonating agent such as chlorosulfonic acid, $ClSO_3H$, or another substance with available sulfur trioxide, $SO_3$, and which is particularly suitable for the nitrosation and oximation reactions with organic compounds) wherein the crude nitrosyl hydrogen pyrosulfate (having a melting point in the range of 112° to 117° C.) is dissolved at an elevated temperature in chlorosulfonic acid so that the weight ratio between the crude nitrosyl hydrogen pyrosulfate and the chlorosulfonic acid is between 1 and 5; the resulting solution is cooled to precipitate crystals of nitrosyl hydrogen pyrosulfate from the mother liquor and the crystals are separated from the mother liquor, and washed with liquid sulfur dioxide to obtain a nitrosyl hydrogen pyrosulfate of a high degree of purity and with a melting point substantially between 119° and 120° C.

Our present invention relates to a process for the purification of nitrosyl hydrogen pyrosulfate and, more particularly, to the purification of this substance by crystallization and solvent extraction.

In the commonly assigned copending application Ser. No. 375,621 of June 16, 1964, entitled "Nitrosyl Hydrogen Pyrosulfate" there is described the physical properties and characteristics of the then-new chemical entity having the empirical formula $HNS_2O_8$ and the structural formula $NO \cdot HS_2O_7$ and identified therein as "nitrosyl hydrogen pyrosulfate." That compound, prepared by the process described in the further commonly assigned copending application Ser. No. 375,622 filed June 16, 1964, and entitled "Process for Preparing Nitrosyl Hydrogen Pyrosulfate" (now U.S. Patent No. 3,436,194 issued Apr. 1, 1969), was characterized by its ability to enter into chemical reactions as a source of nitrosonium ion in the manner of such substances as nitrosyl chloride and nitrosyl hydrogen sulfate and, in fact, in all chemical-synthesis reactions in which the reactivity of the NO group is significant. For example, in application Ser. No. 386,082 of July 29, 1964, entitled "Method of Producing ω-Lactams," (now U.S. Patent No. 3,328,393, issued June 27, 1967), there is described a synthesis reaction in which molecular nitrosyl hydrogen pyrosulfate is combined with a cycloalkanecarboxylic acid, such as cyclohexanoic acid, in a liquid phase at a temperature between substantially 30° C. and 150° C. The resulting product is an ω-lactam with a corresponding ring structure, e.g. caprolactam. The reaction is carried out in aliphatic, cycloaliphatic and chlorinated aliphatic hydrocarbons and in nitroparaffins, the molar ratio of the cycloaliphatic carboxylic acid to the nitrosyl hydrogen pyrosulfate being substantially 0.5 to 2.

As pointed out in the aforementioned applications, this compound is prepared by reacting substantially equimolar quantities of nitrosyl hydrogen sulfate ($NOHSO_4$) with a sulfonating agent containing the $SO_3$ group. A suitable sulfonating agent is monomeric sulfur trioxide ($SO_3$), although the polymeric forms of sulfur trioxide and chlorosulfonic acid ($ClSO_3H$) are also effective. The resulting product, which appears to be a true nitrosyl salt with the structural formula given above, has a melting point (of the pure compound) substantially in the range of 119° to 120° C., is recoverable in the form of white crystals, is strongly hygroscopic, decomposes or dissociates in the presence of water, is soluble in concentrated sulfuric acid and reacts violently with acetic anhydride to yield hydrogen cyanide. The product is also highly advantageous in chemical reactions for the formation of diazo groups and oximation or nitrosation with products such as the lactams mentioned earlier and others commonly known in the organic chemical field.

Nitrosyl hydrogen pyrosulfate is highly advantageous in many chemical-reaction systems because it has relatively high thermal stability and can be used effectively under severe reaction conditions (e.g. elevated temperatures) or in the presence of substances which would decompose other nitrosating or oximating compounds containing the NO group.

In the production of nitrosyl hydrogen pyrosulfate, one obtains a crude product having a melting point between 112° C. and 117° C., the crude product containing small percentages of various impurities which are difficult to eliminate by common crystallization techniques.

In fact, most conventional methods of purification have been found to be ineffective with nitrosyl hydrogen pyrosulfate or to be unusable thereto, inasmuch as this compound is substantially insoluble or of low solubility in the common purification solvents; furthermore, it reacts chemically with many of these solvents, being a highly active nitrosating and oximating source of the NO group. Fusion methods, wherein crystals are melted and then permitted to recrystallize, do not increase the purity of the product.

It is, therefore, the principal object of the present invention to provide an improved process for the purification of nitrosyl hydrogen pyrosulfate, i.e. a compound having the structural formula $NOHS_2O_7$ as described in applications Ser. No. 375,621 and Ser. No. 375,622 (U.S. Patent No. 3,436,194) and discussed above.

A further object of this invention is to extend the principles originally set forth in these commonly assigned copending applications and provide a method of obtaining crystals of nitrosyl hydrogen pyrosulfate of high purity, this method avoiding the disadvantages enumerated above in connection with other purification techniques which may have been deemed applicable.

We have found, surprisingly, that a crude nitrosyl hydrogen pyrosulfate, prepared generally by the method set forth in the commonly assigned application Ser. No. 375,622 (U.S. Patent 3,436,194), and having a melting point from 112° to 117° C., for example, can be purified by crystallization from relatively pure chlorosulfonic acid, the resulting crystals being rinsed, after separation from the chlorosulfonic acid mother liquor, with liquid sulfur dioxide.

Thus, according to an important feature of this invention, the crude nitrosyl hydrogen pyrosulfate is dissolved in chlorosulfonic acid at an elevated temperature (e.g. a temperature up to or somewhat above 100° C.) with gentle stirring. The saturated solution of nitrosyl hydrogen pyrosulfate in the hot chlorosulfonic acid is then permitted to cool, whereupon a mass of white crystals of nitrosyl hydrogen pyrosulfate develop and are recovered from the mother liquor by filtration. The solid product is washed on the filter or separately with liquid sulfur dioxide at a temperature below the boiling point thereof;

thereafter, the crystals are dried in vacuo at a temperature of 30 to 40° C. After such drying, the crystals are found to have a melting point of substantially 119° to 120° C. which remains unchanged even for repeated recrystallization in the manner described above.

According to a further feature of this invention, the nitrosyl hydrogen pyrosulfate is dissolved in the chlorosulfonic acid in an amount such that the weight ratio between them ranges from 1 to 5 and preferably is between substantially 1.5 and 2.5. While the preferred dissolution temperature is of the order of 100° C., as indicated earlier, it has been found to be possible to operate with temperatures between substantially 50° and 150° C.

The invention is further described with respect to the following specific examples demonstrating the best method known to us presently for carrying out the invention in practice:

EXAMPLE I 200 grams of raw nitrosyl hydrogen pyrosulfate (prepared as described in application Ser. No. 375,622, U.S. Patent No. 3,436,194) with a melting point of 113°–116° C. is dissolved in 120 grams of pure chlorosulfonic acid ($ClSO_3H$) with intermittent stirring, the mixture being heated up to a temperature of about 100–110° C.; it is held at this temperature for about 15 minutes. After this time the nitrosyl hydrogen pyrosulfate appears to be completely dissolved in the chlorosulfonic acid. The solution thus obtained is permitted to cool down to room temperature (25° C.). The nitrosyl hydrogen pyrosulfate present in the solution then crystallizes out and is separated by filtration from the mother liquor. The crystals are washed several times with liquid $SO_2$ at —10° C. and dried under vacuum (20 mm. Hg) at 30° C.

The melting point, established in a closed capillary, of the purified nitrosyl hydrogen pyrosulfate is 119°–120° C. and does not change even with repeated crystallizations. The elemental analysis yields the following data (percents by weight):

Calculated for $NOHS_2O_7$: NO=14.48%; $SO_4$=92.75%. Found: NO=14.41%; (sulfur as $SO_4$)=92.81%.

EXAMPLE II

To 200 grams of chlorosulfonic acid heated at 100° C., 350 grams of nitrosyl hydrogen pyrosulfate (prepared as described in application Ser. No. 375,622, U.S. Patent No. 3,436,194) with a melting point equal to 115°–116° C. are added. The mixture is subjected to intermittent stirring while heating is maintained until complete dissolution of the nitrosyl hydrogen pyrosulfate, which occurs after 10 min. The solution is permitted to cool to room temperature (25° C.) and is then kept at 5° C. for a few hours. The nitrosyl hydrogen pyrosulfate crystallizes out and is filtered, from the mother liquor washed with liquid sulfur dioxide and finally dried under vacuum at 40° C. (as described in Example I). The melting point, determined in a closed capillary, of the $NOHS_2O_7$ thus purified is 119° C.

EXAMPLE III

Following the method of Example I, and subjecting the purified product thus obtained (melting point=120° C.) to 5 further dissolution and crystallization cycles, $NOHS_2O_7$ is obtained with an invariable melting point identical to that of the product obtained after the first purification.

The $NOHS_2O_7$ products of Examples I and II are used directly for the synthesis reaction of application Ser. No. 386,082 (U.S. Patent No. 3,328,393) to produce ω-lactams.

We claim:
1. A method of purifying nitrosyl hydrogen pyrosulfate comprising the steps of:
    (a) dissolving crude nitrosyl hydrogen pyrosulfate at a temperature ranging between substantially 50° C. and substantially 150° C. in chlorosulfonic acid, with said nitrosyl hydrogen pyrosulfate and said chlorosulfonic acid in a weight ratio between substantially 1 and 5, to form a solution of said nitrosyl hydrogen pyrosulfate;
    (b) cooling said solution to precipitate crystals of nitrosyl hydrogen pyrosulfate from its mother liquor;
    (c) separating said crystals from said mother liquor; and
    (d) rinsing the crystals separated in step (c) from said mother liquor with liquid sulfur dioxide.

2. The method defined in claim 1 wherein said nitrosyl hydrogen pyrosulfate and said chlorosulfonic acid are in a weight ratio between 1.5 and 2.5 in step (a).

3. The method defined in claim 1 wherein said chlorosulfonic acid is in step (a) saturated with said nitrosyl hydrogen pyrosulfate at a temperature of the order of 100° C.

4. The method defined in claim 1, further comprising the step of:
    (e) drying said crystals rinsed in step (d) by subjecting them to a temperature of substantially 30° to 40° C. in vacuo.

5. The method defined in claim 1 wherein the crude nitrosyl hydrogen pyrosulfate used in step (a), preheated to dissolution in said chlorosulfonic acid, has a melting point in the range of substantially 112 to 117° C.

6. Nitrosyl hydrogen pyrosulfate having a melting point of substantially 119 to 120° C.

FOREIGN PATENTS 1,161,541  1/1964  Germany.

OTHER REFERENCES

Mellor: Comprehensive Treatise on Inorganic and Theoretical Chemistry, vol. 8, p. 700 (1928); vol. 10, p. 244 (1930).

OSCAR R. VERTIZ, Primary Examiner

H. S. MILLER, Assistant Examiner

U.S. Cl. X.R.

23—114